United States Patent
Salsich (10) Patent No.: US 9,040,869 B2
(45) Date of Patent: May 26, 2015

(54) PLASMA CUTTER HAVING MICROPROCESSOR CONTROL

(75) Inventor: Anthony Van Bergen Salsich, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 1283 days.

(21) Appl. No.: 11/960,494

(22) Filed: Dec. 19, 2007

(65) Prior Publication Data

US 2009/0159575 A1   Jun. 25, 2009

(51) Int. Cl.
*B23K 10/00*  (2006.01)
*B23K 1/00*  (2006.01)

(52) U.S. Cl.
CPC .......... *B23K 1/0016* (2013.01); *B23K 2201/40* (2013.01)

(58) Field of Classification Search
CPC .............. H05H 1/36; H05H 1/34; H05H 1/28
USPC ............. 219/121.39, 121.45, 121.48, 121.51, 219/121.54, 121.57, 133, 134
See application file for complete search history.

(56) References Cited

U.S. PATENT DOCUMENTS

| | | |
|---|---|---|
| 4,117,527 A | 9/1978 | Demarest et al. |
| 4,251,764 A | 2/1981 | Mathews |
| 4,410,788 A | 10/1983 | Summers et al. |
| 4,453,073 A | 6/1984 | Bredenkamp |
| 4,785,149 A | 11/1988 | Gilliland |
| 4,918,285 A | 4/1990 | Thommes |
| 4,943,699 A | 7/1990 | Thommes |
| 5,043,554 A | 8/1991 | Kohsaka et al. |
| 5,086,205 A | 2/1992 | Thommes |
| 5,290,995 A | 3/1994 | Higgins et al. |
| 5,726,416 A | 3/1998 | Katooka et al. |
| 5,990,446 A | 11/1999 | Zhang et al. |
| 5,994,675 A | 11/1999 | Bethune et al. |
| 6,057,524 A | 5/2000 | Katooka et al. |
| 6,087,922 A | 7/2000 | Smith |
| 6,130,398 A | 10/2000 | Schneider et al. |

(Continued)

FOREIGN PATENT DOCUMENTS

| | | |
|---|---|---|
| GB | 2039174 | 7/1980 |
| JP | 02217175 | 8/1990 |

(Continued)

OTHER PUBLICATIONS

U.S. Appl. No. 11/947,762, filed Nov. 29, 2007, Lezner et al.

(Continued)

*Primary Examiner* — Mark Paschall
(74) *Attorney, Agent, or Firm* — Fletcher Yoder P.C.

(57) ABSTRACT

A system is provided that includes a torch power unit, wherein the torch power unit includes a motor and a digital device coupled to the motor and configured to control the motor. A method of operation is provided that includes controlling one or more aspects of a torch power unit via a microprocessor, a digital signal processor, or a field programmable gate array, or a combination thereof. In another embodiment, a system is provided that includes a torch power unit that includes a torch, one or more components comprising a generator, a power converter, a compressor, a motor, a wire feeder, or a combination thereof, and a microprocessor configured to control the one or more components.

25 Claims, 4 Drawing Sheets

(56) References Cited

U.S. PATENT DOCUMENTS

| | | | |
|---|---|---|---|
| 6,194,682 | B1 | 2/2001 | Schneider et al. |
| 6,313,431 | B1 * | 11/2001 | Schneider et al. ....... 219/121.57 |
| 6,339,320 | B1 * | 1/2002 | Spremo et al. ................ 323/355 |
| 6,365,868 | B1 | 4/2002 | Borowy et al. |
| 6,570,129 | B1 | 5/2003 | Samodell |
| 7,547,861 | B2 * | 6/2009 | Jorgensen .................. 219/121.5 |
| 2001/0042736 | A1 * | 11/2001 | Schneider et al. ....... 219/121.55 |
| 2004/0031776 | A1 | 2/2004 | Gevelber et al. |
| 2005/0155959 | A1 | 7/2005 | Bender et al. |
| 2006/0076330 | A1 | 4/2006 | Beistle et al. |
| 2006/0289492 | A1 | 12/2006 | Thomas et al. |
| 2006/0289495 | A1 | 12/2006 | Thomas et al. |
| 2008/0023449 | A1 | 1/2008 | Salsich et al. |
| 2008/0023451 | A1 | 1/2008 | Salsich et al. |

FOREIGN PATENT DOCUMENTS

| | | |
|---|---|---|
| JP | 10109166 | 4/1998 |
| WO | 9422198 A1 | 9/1994 |
| WO | WO2006035329 | 4/2006 |

OTHER PUBLICATIONS

U.S. Appl. No. 11/960,425, filed Dec. 19, 2007, Salsich.
U.S. Appl. No. 11/960,466, filed Dec. 19, 2007, Salsich et al.
U.S. Appl. No. 11/960,514, filed Dec. 19, 2007, Salsich et al.
Millerwelds; Owner's Manual entitled "Spectrum 125C and ICE-12C Torch;" www.millerwelds.com/om/o2248e_mil.pdf; 32 pages, issued Feb. 2007.
Millerwelds; Article entitled "Spectrum 125C—The Power of Blue;" issued Mar. 2007; Index No. PC/13.0; www.millerselds.com/pdf/spec_sheets/PC13-0.pdf; 4 pages.

\* cited by examiner

PLASMA CUTTER HAVING MICROPROCESSOR CONTROL

BACKGROUND

The invention relates generally to metal cutting and welding systems, and more particularly control for plasma cutting systems.

A plasma cutting system creates plasma (e.g., high temperature ionized gas) to cut metal or other electrically conductive material. In general, an electrical arc converts a gas (e.g., compressed air) into plasma, which is sufficiently hot to melt the work piece while the pressure of the gas blows away the molten metal. The power output and flow of the gas can affect the performance of the system. Unfortunately, the control for plasma cutting systems is generally limited, and users often manually adjust parameters based on experience and their own visualization of the cutting process.

In many systems, including the plasma cutting system, a compressor (e.g., standalone compressor) is used to supply a compressed gas (e.g., air). In such systems, the compressor may be driven by a motor having its own power converter. The motor power converter may be controlled by a controller chip or other circuit. Unfortunately, this adds cost, complexity and size to the system with limited control functions.

BRIEF DESCRIPTION

In one embodiment, a system is provided that includes a torch power unit. The torch power unit includes a motor and a digital device coupled to the motor and configured to control the motor.

A method of operation is also provided that includes controlling one or more aspects of a torch power unit via a microprocessor, a digital signal processor, or a field programmable gate array, or a combination thereof.

In another embodiment, a controller is provided that includes a microprocessor configured to control output of a compressor, a generator, a wire feeder, a motor, or a combination thereof, of a torch system.

Tangible machine-readable medium that includes code configured to control output of a compressor, a generator, a wire feeder, a motor, or a combination thereof, of a torch system is also provided.

In another embodiment, another system is provided that includes a torch power unit. The torch power unit includes a torch, one or more components comprising a generator, a power converter, a compressor, a motor, a wire feeder, or a combination thereof, and a microprocessor configured to control the one or more components.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
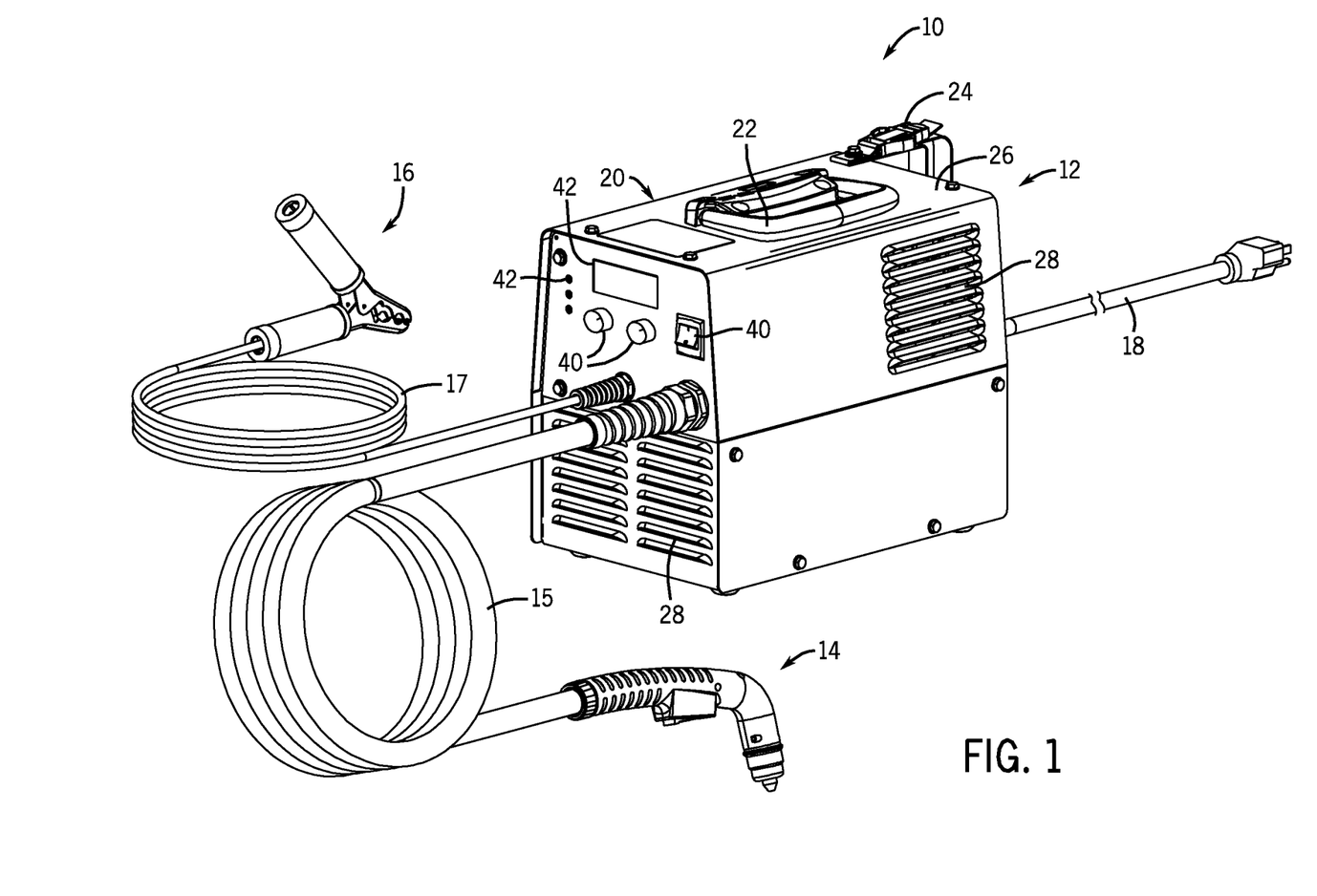
FIG. 1 is a partial perspective view of an exemplary plasma cutting system having a gas compressor and digital power control in accordance with embodiments of the present invention.
Figure 2:
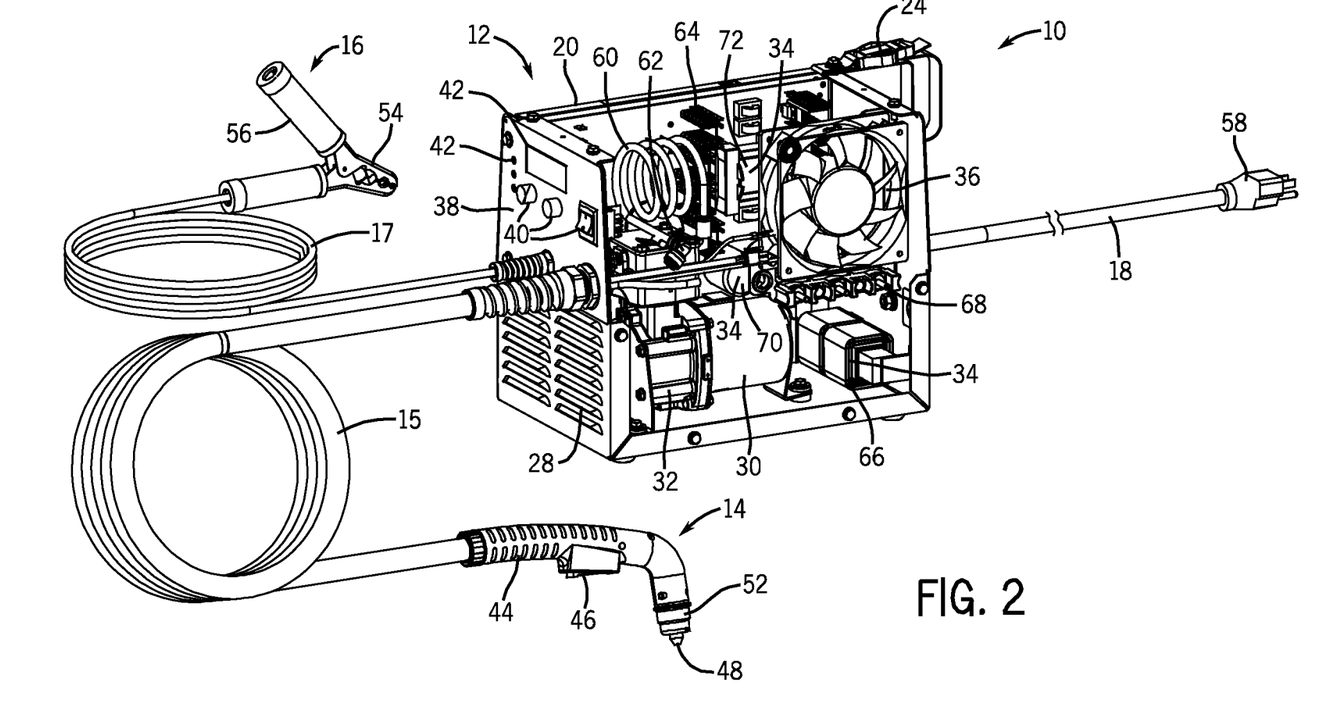
FIG. 2 is another partial perspective view of the plasma cutting system as illustrated in FIG. 1, wherein an entire side panel assembly is removed to further illustrate various internal features in accordance with embodiments of the present invention.

As discussed further below, a digital power control system may be incorporated into a compressor and/or a torch power unit, such as a plasma cutting unit, a metal inert gas (MIG) welding unit, and so forth. Referring now to the drawings, FIGS. 1 and 2 are partial perspective views illustrating an embodiment of a portable plasma cutting system 10 having microprocessor control of one or more feature, such as electrical output, compressed gas output, and so forth. Specifically, FIG. 1 illustrates the system 10 with access panels completely assembled to close internal components, whereas FIG. 2 illustrates an entire side panel assembly removed to provide a better view of the internal features and components of the system 10. As discussed in further detail below, the digital power control system may receive feedback from components in the system 10 and adjust the power supplied to those components or take other actions in response to the feedback.

The illustrated plasma cutting system 10 includes a torch power unit 12 coupled to a plasma torch 14 and a work piece clamp 16 via a torch cable 15 and a work piece cable 17, respectively. The torch power unit 12 may be coupled to a power source (e.g., a power grid or a motor-driven generator) via a power cable 18. The power source may provide a pilot current to a cathode, such as a movable electrode, and to the anode, such as the nozzle of the torch 14, that are forced into contact via a spring. After electrical current begins to flow from the electrode to the nozzle of the torch 14, gas or air supplied to the torch 14 counteracts the spring force and moves the electrode away from the nozzle. This breaks the electrical contact between the electrode and the nozzle and creates the pilot arc. Also, as the electrode moves away from the nozzle, it opens a nozzle orifice (connected to the air supply), and a plasma jet is created. The plasma jet causes the arc to transfer (at least in part) to the work piece held by the clamp 16, thus initiating cutting. Electronics in the power source sense when the arc has transferred and then supply a main cutting current of greater amperage after the transfer has occurred. Also, the tip of the torch 14 is disconnected (electrically), interrupting the pilot current path. Thus, the current is used to cut the work piece, and follows a path including the positive terminal, the work piece and the electrode. For example, the power unit 12 may be configured to supply a suitable voltage and current to create an electrical circuit from the unit 12, along the cable 15 to the torch 14, across a gap between the torch 14 and a work piece (e.g., as an electrical arc), through the work piece to the clamp 16, through the cable 17 back to the unit 12. In alternate embodiments, a non-moving electrode torch may be used in which a pilot arc is created via a high voltage and/or high frequency circuit, so that the high voltage may cause the arc to jump from the non-moving electrode to the nozzle. In yet other embodiments, any suitable torch and starting technique may be used.

The power unit 12 includes an enclosure 20 defining a generally closed volume to support various circuits, sensor features, control features, and gas supply features (e.g., air compressor). As discussed in detail below, the illustrated system 10 includes a variety of features to improve portability, serviceability, reliability, and control of the plasma torch 14 and the components within the single enclosure 20 of the system 10. For example, the system 10 may include sensors and controls to adjust the power unit 10 to account for various conditions, e.g., altitude, temperature, pressure, and so forth. The illustrated system 10 also may include a handle 22 on the top side of the enclosure 20 to enable easier transportation of the system 10. The illustrated system 10 also may include a latching mechanism 24 that may secure the torch 14, the cable 17, the clamp 16, and/or the power 18. The enclosure 20 may also include vents 28 to relieve heat and/or pressure inside the system 10. Additional vents may be located on other panels of the enclosure 20.

To provide for operation of the plasma torch 14, the system 10 may include a compressor motor 30, such as a DC or AC motor that may include brushed, brushless, switched reluctance, or any other suitable type of motor, and a compressor 32. For example, the compressor 32 may include a positive displacement compressor, such as reciprocating compressor (e.g., piston-cylinder), a rotary screw compressor (e.g., helical screws to compress a gas continuously without a storage tank), a diaphragm compressor, or the like. In certain embodiments, the system 10 may include a flow or pressure meter or like sensor configured to monitor output of the compressor 32. The system 10 also may include environmental sensors, such as a pressure sensor, a temperature sensor, an altimeter, a humidity sensor, or a combination thereof, to provide feedback used to adjust the motor 30, the compressor 32, power electronics 34, or a combination thereof. The power electronics 34 may be configured to condition and provide power to the torch 14 and the compressor 32, and may include transformers, circuit boards, and/or other components. A fan 36 may also be included inside the system 10 to provide air circulation and cooling to the system 10. Additionally, as depicted in FIG. 2, the fan 36 may be located next to one of the vents 28 to optimize air circulation. Additional fans 36 may be included at other locations inside or outside the enclosure 20.

In the illustrated system 10, a control panel 38 is included at an end of the power unit 12. The control panel 38 may include various control inputs, indicators, displays, electrical outputs, air outputs, and so forth. In an embodiment, a user input 40 may include a button, knob, or switch configured to enable selection of a mode of operation (e.g., plasma cut, gouge, etc.), power on/off, an output current level, gas (e.g., air) flow rate, gas (e.g., air) pressure, gas type, a work piece type, a control type (e.g., manual or automatic feedback control), or a combination thereof. The control panel 34 may also include various indicators 42 to provide feedback to the user. For example, the indicators 42 may include one or more light emitting diodes (LED) and/or liquid crystal displays (LCD) to display on/off status, current level, voltage level, gas (e.g., air) pressure, gas (e.g., air) flow, environmental conditions (e.g., altitude, temperature, pressure, etc.), or any other parameter. Additionally, the indicators 42 may include an LED or LCD that displays a trouble or warning indicator if there is a problem with the system 10. Embodiments of the control panel 38 may include any number inputs and outputs, such as welding methods, air compressor settings, oil pressure, oil temperature, and system power.

Further, the user inputs 40 and indicators 42 may be electrically coupled to control circuitry and enable a user to set and monitor various parameters of the system 10. For example, the indicators 42 may display environmental conditions (e.g., altitude, temperature, pressure, etc.) that prompt a user to manually adjust the current, voltage, gas flow rate, gas pressure, or other operational parameters, or a combination thereof. The indicators 42 also may prompt a user to enable the system to perform automatic adjustments in view of the sensed environmental conditions. For example, one of the inputs 40 may enable a user to select an automatic feedback control mode based on environmental conditions and/or sensed parameters of the system 10 (e.g., compressor output).

The plasma torch 14 includes a handle 44, a locking trigger 46, a tip 48, a retaining cap 52, as well as an electrode inside the torch 14. The clamp 16 comprises an electrically conductive material clamping portion 54 having insulated handles 56. The power cable 18 includes a plug 58 for connection to a power source such as a wall socket or a motor-driven generator. The plug 58 may be configured to work with a variety of sockets or outlets, and the system 10 may receive different power sources, such as AC 50/60 Hz, 400 Hz, single or three phase 120V, 230V, 400V, 460V, 575V, etc.

Turning now in more detail to FIG. 2, the system 10 includes the fan 36, the gas compressor 32, a heat exchanger 60, pneumatic coupling 62, and heat sinks 64. Additionally, the power electronics 34 includes ground fault circuit interrupt (GFCI) dual inductor 66, primary terminal block 68, bus capacitor 70, and transformer 72. Additionally, the system 10 may include additional inductors, terminals capacitors, transformers, or other electrical components and is not limited to the components illustrated in FIGS. 1-2.

As mentioned above, the gas compressor 32 may be a reciprocating compressor (e.g., piston-type compressor), a diaphragm compressor, or a rotary screw compressor. In the illustrated embodiment, the gas compressor 32 is a single stage reciprocating compressor. The compressor 32 may include or may be connected to the DC or AC motor 30 that is connected to power electronics 34 inside the system 10, such that the motor 30 drives the compressor 32. The gas compressor 32 may be rigidly mounting inside the enclosure 20 using compressor mounts such as rubber mounts, plastic mounts, metal mounts, or any other material. The compressor mounts may be configured to dampen vibrations of the compressor or to allow slight movement of the compressor during operation.

In the illustrated embodiment, the gas compressor 32 intakes and compresses air directly from the atmosphere, such as via a filter, and may use one of the vents 28 as an intake vent to enable air to flow into the compressor 32. The gas used by the compressor 32 may be any gas, such as nitrogen, argon, hydrogen, oxygen, or any combination thereof. Accordingly, the gas compressor 32 may provide a direct supply of compressed gas (e.g., air) on-demand to a desired application, such as the plasma torch 14. Thus, the torch 14 may consume air directly from the unit 12 without the air being compressed into a tank downstream of the compressor 32. However, alternative embodiments may include an air tank configured to store the compressed air.

To ensure reliability and performance for the system 10, various temperature sensors (e.g., thermistors) may be included inside the enclosure 20 to measure the temperature of various components. For example, the system 10 may include a temperature sensor configured to measure the temperature of the motor 30, the compressor 32, the power electronics 34, atmospheric air, and so forth. In addition to each temperature sensor, the system 10 may include control and/or monitoring logic to receive signals from the temperature sensors and perform the appropriate action or indication. For example, if the signal from one or more of the temperature sensors (e.g., thermistors) exceeds a threshold temperature or voltage for a component, then the control and monitoring logic may provide a visual warning by activating a LED or LCD 42 on the control panel 38. If the signal from a temperature sensor (e.g., thermistor) exceeds another threshold temperature or voltage and/or the signal remains above the threshold for a specific duration, then the control and monitoring logic may shutdown the system 10 or that component. The control and monitoring logic may prevent use of the system 10 until the signals from the temperature sensors fall below the threshold levels.

The system 10 may also include control circuitry to coordinate functions of the system components. For example, the system 10 may include control circuitry in the vicinity of the control panel 34. In one embodiment, the control circuitry may include a processor, memory, and software code configured to control and or coordinate operation of the system 10.

The system 10 may include cooling components such as the heat sinks 64 and may include active cooling via the fan 36. The heat sinks 64 may be mounted such that airflow from the fan 36 circulates air around the heat sinks, further enhancing the cooling capability of the heat sinks 64. As discussed above, additional fans may be included in other locations in the system 10. Similarly, additional heat sinks may be placed inside the system 10 depending on those areas that need passive cooling and/or cannot be cooled by any of the fans in the system 10. Thus, in other embodiments, the system 10 may include any number and combination of active and passive cooling components.

During operation of the system 10, a user first connects the system to a power source, such as a wall socket, via the power cable 18 and the plug 58. A user may then turn on the system 10 via the user input 40. The compressor 32, fan 36, and other components of the system 12 receive power from the power electronics 34 and begin operation after the user input is activated and the control circuitry calls for operation. A user then attaches the clamp 16 to a work piece (e.g., metal or other material) to be cut. To begin cutting the work piece, the user places the cutting torch 14 adjacent the work piece and activates the trigger 46, which may involve raising a locking mechanism to free the trigger 46 before depressing the trigger 46. Compressed gas from the gas compressor 32 passes through the heat exchanger 60 and through the torch cable 15 and out the tip 48 of the torch 14. As discussed above, a pilot current may be supplied between a moveable electrode and the nozzle of the torch 14, thus establishing a pilot arc when the moveable electrode is pushed away from the nozzle of the torch 14 by the gas supplied by the compressor 32. As the electrode moves away from the nozzle of the torch, gas flowing through the torch 14 is energized into a plasma jet which in turn transfers the arc to the work piece.

The electrical arc heats up the gas from the compressor 32, converting it to plasma that is hot enough to cut the work piece. As the user moves the torch 14 across the work piece by dragging, using a drag shield, standoff guide, or the like, the material is cut as the plasma moves through the material. The thickness of the material being cut may be limited by the power of the system 10, the output of the compressor 32, and the torch 14. In addition to supplying the plasma, the compressed gas from the compressor 32 cools the torch 14 and blows away molten material (e.g., molten metal). At the end of the cut, the user releases the trigger 46 of the torch 14. Gas may continue to flow through the torch 14 for a period of time sufficient to cool the consumables, in a state known as "postflow." The postflow cools the torch 14 and ensures that any remaining material is blown away.

Figure 3:
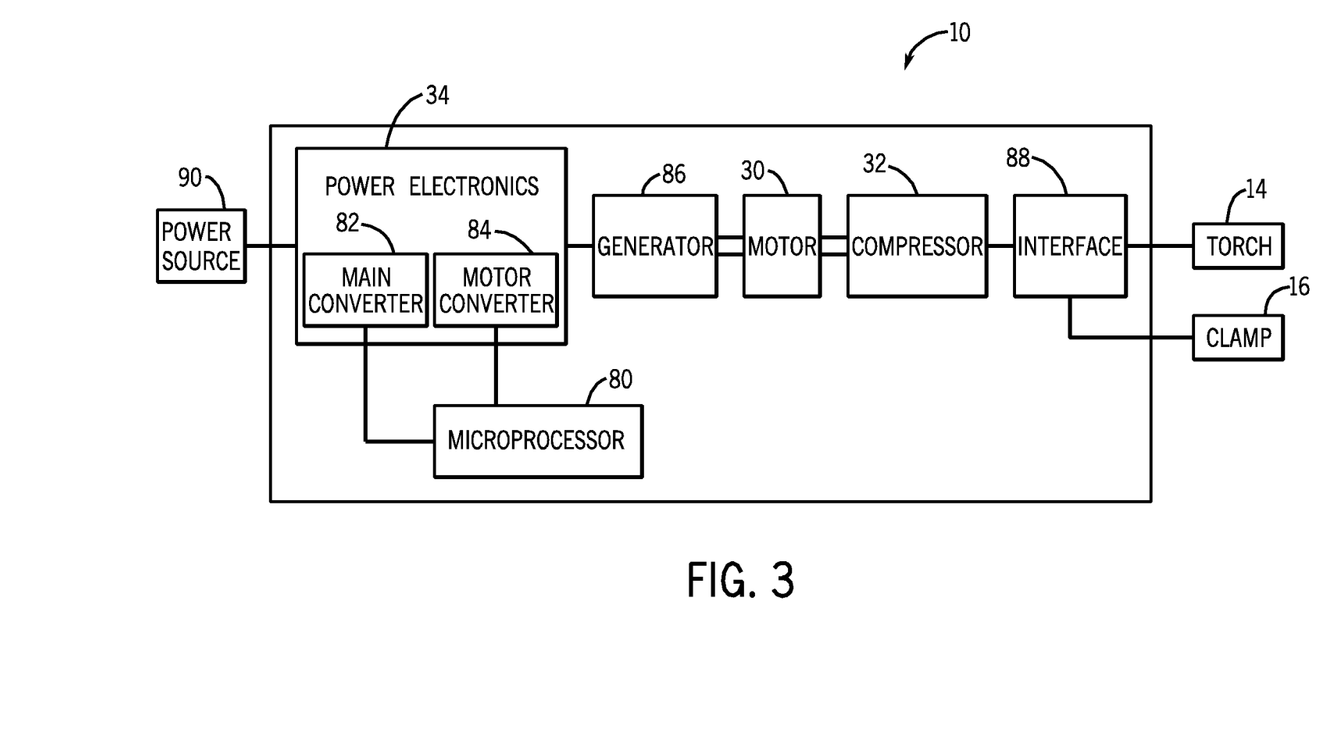
FIG. 3 is a block diagram of the system of FIGS. 1-2 and a digital power control system in accordance with an embodiment of the present invention.

FIG. 3 is a block diagram of the system 10 using digital power control in accordance with an embodiment of the present invention. In the illustrated embodiment, the digital power control is accomplished via the use of a general-purpose microprocessor 80; however, in other embodiments a field programmable gate array (FPGA), digital signal processor (DSP), or any other suitable digital device or combination thereof may be used. The power electronics 34 may include components for a main power converter 82 and a motor power converter 84 which may be digitally controlled by the microprocessor 80. For example, the microprocessor 80 may control operation of the plasma cutting torch 14 and the system 10 via the main power converter 82. The embodiment illustrated in FIG. 3 also includes a power generator 86, the motor 30, the compressor 32, an interface 88, the torch 14, and the clamp 16, and is connected to an external power source 90.

The compressor 32 is driven by the motor 30, which may be controlled by the microprocessor 80. As discussed above, the motor 30 may be an electric motor, such as a DC motor, or a gas combustion engine. If the motor 30 is electric, then the microprocessor 80 may control the motor power converter 84. If the motor 30 is gas powered, then the microprocessor 80 may control fuel injection, timing, and so forth. For example, the motor 30 may include a two-stroke or four-stroke spark-ignition engine, which includes one or more reciprocating piston in cylinder assemblies, a carburetor or fuel injection system, and so forth. Some embodiments of the system 10 may include the power generator 86 built-in or integrally disposed within the enclosure 20 of the power unit 12. Thus, the motor 30 may drive both the compressor 32 and the electrical generator 86, thereby making the power unit 12 completely portable for use in remote locations. In such an embodiment, the microprocessor 80 may control the motor 30 to vary electrical output of the generator 86 and compressed gas output of the compressor 32. However, other embodiments may exclude the generator 86 to reduce the size, weight, and cost of the power unit 12. In addition to the main power converter 82 and motor power converter 84, in some embodiments the power electronics 34 include a plasma cutting circuit, a welding circuit, a user input/interface circuit, or a combination thereof.

In addition to controlling the main power converter 82 and the motor power converter 84, the microprocessor 80 may be a part of the main control loop for the compressor motor 30. For example, the microprocessor 80 may control and monitor the speed or output of the compressor 32 and/or motor 30, and may also control and monitor the voltage, current, or other parameter of the compressor 32 and/or motor 30. The microprocessor 80 may receive voltage, current, or other feedback from the motor power converter 84 and send a control signal to the motor power converter 84, thus adjusting the motor 30 in response to changes in voltage, current, pressure, manual input, or other feedback.

In one embodiment, the motor power converter 84 may be a switch-mode power converter having one or more power switches, the gates of which may be directly driven by the microprocessor 80. For example, the microprocessor 80 can provide a pulse width modulated signal that passes through a buffer amplifier and then to the power converter 84. Other components may be included, such as an analog-to-digital converter (A/D converter) to convert the feedback from the motor 30 to a digital signal for use by the microprocessor 80. A digital-to-analog converter (D/A converter) may be included to convert the digital signal from the microprocessor 80 to an analog signal to convey for actual control.

Additionally, in some embodiments, the microprocessor 80 may change these parameters in response to signals received by a user through the interface 88. For example, if a user activates or turns on the system 10 and the compressor 32 through the control panel/interface 88, the microprocessor 80 may start-up the motor 30 and the compressor 32. Similarly, a shutdown signal received from the interface 88 in response to a user turning off the system 10 would result in the microprocessor 80 shutting down the motor 30 and compressor 32. Additionally, in some embodiments a user may manually control current, voltage, etc, and the microprocessor 80 may change the current, voltage, etc. in response to these manual changes.

In some embodiments, the microprocessor 80 may be included in the system 10 for control of other components, such as the main power converter 82. Advantageously, if the microprocessor 80 is included in the system to control the main power converter 82 or other components, then the control logic for the motor power converter 84 may be stored in memory and implemented in software executable on the microprocessor 80, thus utilizing the existing microprocessor 80 without requiring an additional microprocessor to be added to the system. Using the microprocessor 80 to control the motor power converter 84 allows for the removal and elimination of the switchmode controller chip or other circuit that may have been used to control the switches of the motor power converter 84. Additionally, removal of the controller chip or other circuit and utilization of a microprocessor in the system for multiple control purposes reduces cost, weight, and power requirements of the system 10.

Figure 4:
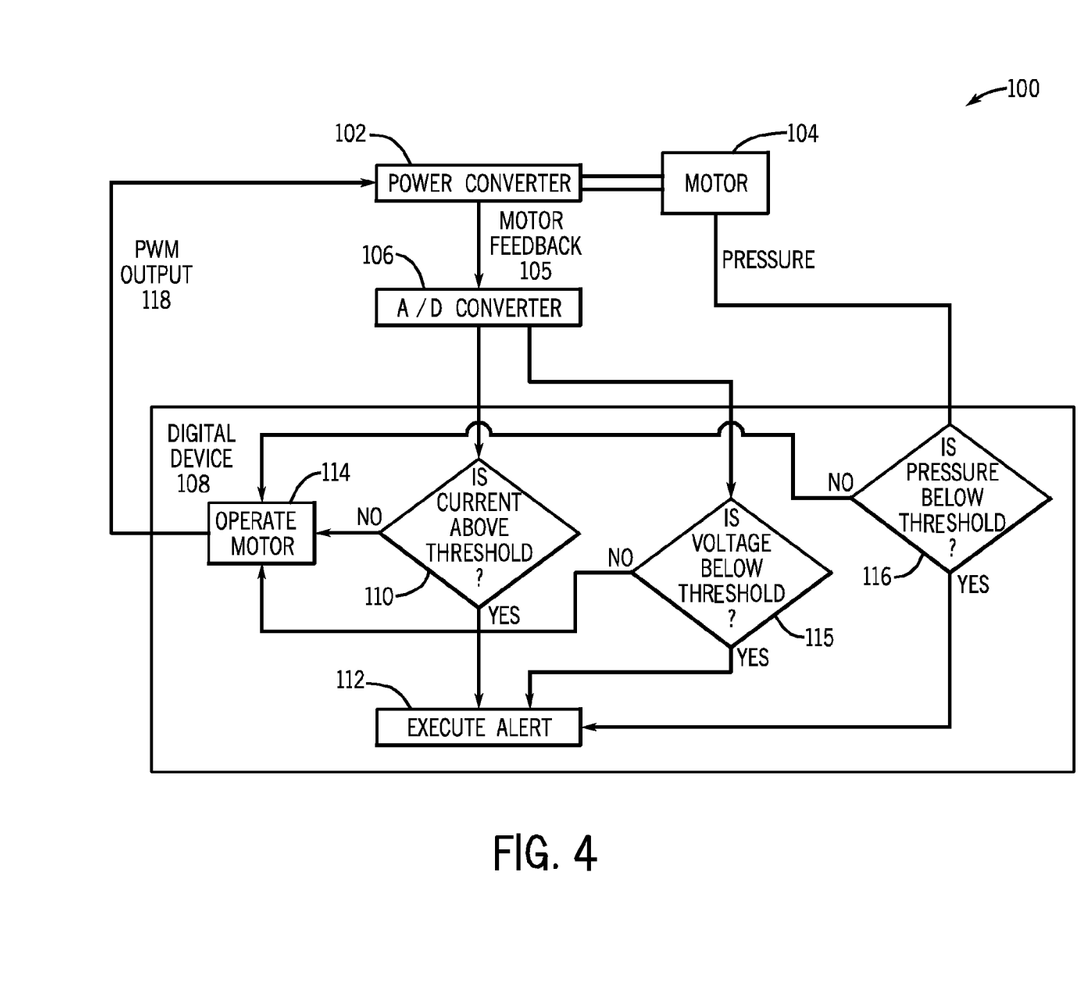
FIG. 4 is a block diagram of a digital power control loop with digital power control for a plasma cutting system in accordance with an embodiment of the present invention.

FIG. 4 depicts a block diagram 100 of a digital power control loop for a power converter according to an embodiment of the present invention. A power converter 102 provides power to a motor 104, such as a motor for a compressor as discussed above. The power converter 102 may provide motor feedback 105, such as current, voltage, or other signals. The feedback 105 may pass through an A/D converter 106 to convert the signals into digital form for use by a digital device 108. As discussed above, in one embodiment the digital device 108 may include a microprocessor. In other embodiments, the digital device 108 may include a field-programmable gate array (FPGA) a digital signal processor (DSP), any suitable digital device, or any combination thereof.

The digital device 108 receives the digitized motor feedback and can use those signals for a variety of functions, including control of the power converter 102 and motor 104. For example, as illustrated in FIG. 4, the digital device 108 may compare the current with a threshold current (block 110). If the current is above the threshold, then the device 108 may execute an alert (block 112) that may activate an indicator elsewhere in the system. If the current is not sufficiently high to activate an alert, than the digital device 108 may continue to operate the motor (block 114) via signals sent to the power converter 84. The digital device may also evaluate any other signal to control operation of the motor 104. For example, the digital device may compare the voltage of the motor to a threshold (block 115). If the voltage is below the threshold voltage, the digital device may execute the alert (block 112). If the voltage is above the threshold voltage, the digital device may continue to operate the motor (block 114). Similarly, the digital device may also evaluate a pressure signal (block 116) from the motor 104, representing the pressure of the compressor coupled to the motor 104. For example, if the pressure is below a threshold value, the digital device may execute the alert (block 112), or, if the pressure is above a threshold value, the digital device may continue to operate the motor (block 114). In this manner, the digital device may operate the motor 104 based on any number or combination of signals and feedback, such as current, voltage, pressure, air flow rate, or any other suitable parameter.

The digital device 108 may send a digital pulse width modulated (PWM) signal 118 to the power converter 102, which continues to send signals to the motor 104 based on the PWM signal. In other embodiments, other functions may be implemented on the digital device 108. For example, any alert, monitor, or control function that uses current, voltage, or other feedback from the motor 104 and/or power converter 102 may be implemented.

It should be appreciated that the digital power control of a motor power converter described herein is applicable to other portable systems using a motor and/or a compressor. For example, an engine-driven welding system that includes an engine, generator, motor, and compressor, and/or wire feeders, may also implement digital power control of a motor power converter such as illustrated in FIG. 4.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
   a plasma cutter comprising:
   a motor;
   a compressor coupled to the motor;
   a power converter coupled to the motor; and
   a microprocessor comprising memory and instructions stored on the memory, wherein the microprocessor is coupled to the power converter, wherein the instructions are configured to control the power converter and at least one component of the plasma cutter other than the power converter, the plasma cutter is configured to generate a plasma jet, the plasma jet has a temperature sufficiently hot to melt a workpiece, and the plasma jet has a pressure sufficiently high to blow away a melted portion of the workpiece.

2. The system of claim 1, wherein the microprocessor is configured to operate directly a plurality of switches of the power converter.

3. The system of claim 1, wherein the microprocessor is configured to provide a pulse width modulated signal to the power converter without a switchmode controller chip separate from the power converter.

4. The system of claim 1, wherein the microprocessor is configured to receive a signal from the motor, wherein the signal represents current, voltage, pressure, air flow rate, or a combination thereof.

5. The system of claim 1, wherein the plasma cutter comprises a plasma cutting circuit, a workpiece cable having a clamp configured to couple to the workpiece, and a plasma torch configured to output the plasma jet onto the workpiece.

6. The system of claim 1, wherein the plasma cutter comprises a power generator, a compressor, and a wire feeder, wherein the microprocessor is configured to control the power generator, the compressor, and the wire feeder.

7. The system of claim 1, wherein the microprocessor is configured to execute closed loop control in response to feedback.

8. The system of claim 1, wherein the plasma cutter comprises a power generator and a compressor, wherein the microprocessor is configured to control the power generator and the compressor.

9. A method of operation, comprising:
   controlling a power converter and at least one component other than the power converter of a plasma cutter unit via a microprocessor, a digital signal processor, or a field programmable gate array, or a combination thereof; and
   generating a plasma jet via the plasma cutter unit, wherein the plasma jet has a temperature sufficiently hot to melt a workpiece, and the plasma jet has a pressure sufficiently high to blow away a melted portion of the workpiece.

10. The method of claim 9, comprising controlling a motor of the plasma cutter unit via the microprocessor, the digital signal processor, or the field programmable gate array, or the combination thereof.

11. The method of claim 9, comprising controlling a compressor and a generator of the plasma cutter unit via the microprocessor, the digital signal processor, or the field programmable gate array, or the combination thereof.

12. The method of claim 9, wherein controlling comprises using memory and instructions stored on the memory of the microprocessor, the digital signal processor, or the field programmable gate array, or the combination thereof.

13. The method of claim 9, wherein controlling comprises providing a pulse width modulated signal via the microprocessor, the digital signal processor, or the field programmable gate array, or the combination thereof.

14. The method of claim 9, wherein the plasma jet causes an arc to transfer to the workpiece, creating an electrical circuit from the plasma cutter unit, through the arc, through the workpiece, and back to the plasma cutter unit.

15. A system comprising:
a plasma cutter controller comprising a microprocessor having memory and instructions stored on the memory, wherein the instructions are configured to control a power converter and at least one component other than the power converter of a plasma cutter unit, wherein the at least one component comprises a compressor, a generator, a wire feeder, a motor, a plasma cutting torch, an engine, or a combination thereof, of the plasma cutter unit, the plasma cutter unit is configured to generate a plasma jet, the plasma jet has a temperature sufficiently hot to melt a workpiece, and the plasma jet has a pressure sufficiently high to blow away a melted portion of the workpiece.

16. A system, comprising:
a torch power unit, comprising:
a plurality of components comprising a generator, a power converter, a compressor, a motor, a wire feeder, or a combination thereof; and
a microprocessor comprising memory and instructions stored on the memory, wherein the instructions are configured to control at least two different components of the plurality of components, and the torch power unit is configured to enable a torch to melt a workpiece.

17. The system of claim 16, comprising a plasma cutting circuit controlled by the instructions stored on the memory of the microprocessor, the torch has a temperature sufficiently hot to melt the workpiece, and the torch has a pressure sufficiently high to blow away a melted portion of the workpiece.

18. The system of claim 16, wherein the instructions are configured to control at least three different components of the plurality of components.

19. The system of claim 16, comprising a plasma cutting circuit, the compressor, and the motor coupled to the compressor, each controlled by the instructions stored on the memory of the microprocessor.

20. A system, comprising:
a torch power unit, comprising:
a motor;
a compressor driven by the motor;
an electrical generator driven by the motor; and
a microprocessor, a field programmable gate array, or a digital signal processor configured to control both output of the compressor and electrical output of the electrical generator, and the torch power unit is configured to generate a plasma with a temperature and pressure sufficient to melt and blow away a portion of a workpiece.

21. The system of claim 20, wherein the microprocessor is configured to control both the output of the compressor and the electrical output of the electrical generator.

22. The system of claim 20, wherein the field programmable gate array is configured to control both the output of the compressor and the electrical output of the electrical generator.

23. The system of claim 20, wherein the digital signal processor is configured to control both the output of the compressor and the electrical output of the electrical generator.

24. The system of claim 20, wherein the torch power unit comprises a power converter, and the microprocessor, the field programmable gate array, or the digital signal processor is configured to control the power converter without a switch-mode controller chip separate from the power converter.

25. The system of claim 20, wherein the microprocessor, the field programmable gate array, or the digital signal processor is configured to control all functions of the torch power unit.

* * * * *